United States Patent [19]

Hansen

[11] Patent Number: 4,469,116

[45] Date of Patent: Sep. 4, 1984

[54] VALVE DEVICE FOR THE PREVENTION OF THE OVERFILLING OF PORTABLE CONTAINERS, PARTICULARY GAS CYLINDERS

[75] Inventor: Frits P. U. Hansen, Rungsted Kyst, Denmark

[73] Assignee: Kosan Teknova, A/S, Niva, Denmark

[21] Appl. No.: 493,214

[22] Filed: May 10, 1983

[30] Foreign Application Priority Data

May 17, 1982 [DK] Denmark ............................. 2224/82

[51] Int. Cl.³ ...................... F16K 17/36; F16K 31/18
[52] U.S. Cl. ....................................... 137/39; 137/45; 137/389; 137/447; 141/213
[58] Field of Search ....................... 137/38, 39, 43, 45, 137/389, 447; 141/213, 216

[56] References Cited

U.S. PATENT DOCUMENTS 689,176 12/1901 Ford ..................................... 137/447
2,082,723 6/1937 Seward ................................. 137/45

FOREIGN PATENT DOCUMENTS 2386749 12/1978 France ................................... 137/43

Primary Examiner—Robert G. Nilson
Attorney, Agent, or Firm—Anthony A. O'Brien

[57] ABSTRACT

A valve device serving to prevent overfilling of portable containers, particularly liquid gas cylinders, includes a ball which is freely rotatable relative to a spherical seating face in a casing having a filling channel extending to said seating face. The ball has a passage which in the prescribed filling position communicates with the channel, and the ball is through a rod and a flexible link connected to a load member. As long as this load member is above the liquid level, it tends to keep the ball, and thus its passage in a given orientation so that the communication is broken if the container is tilted away from the prescribed filling position.

When the liquid level has reached a predetermined height, the load member acts as a float so as to interrupt the filling operation by causing the ball to change its orientation.

1 Claim, 1 Drawing Figure

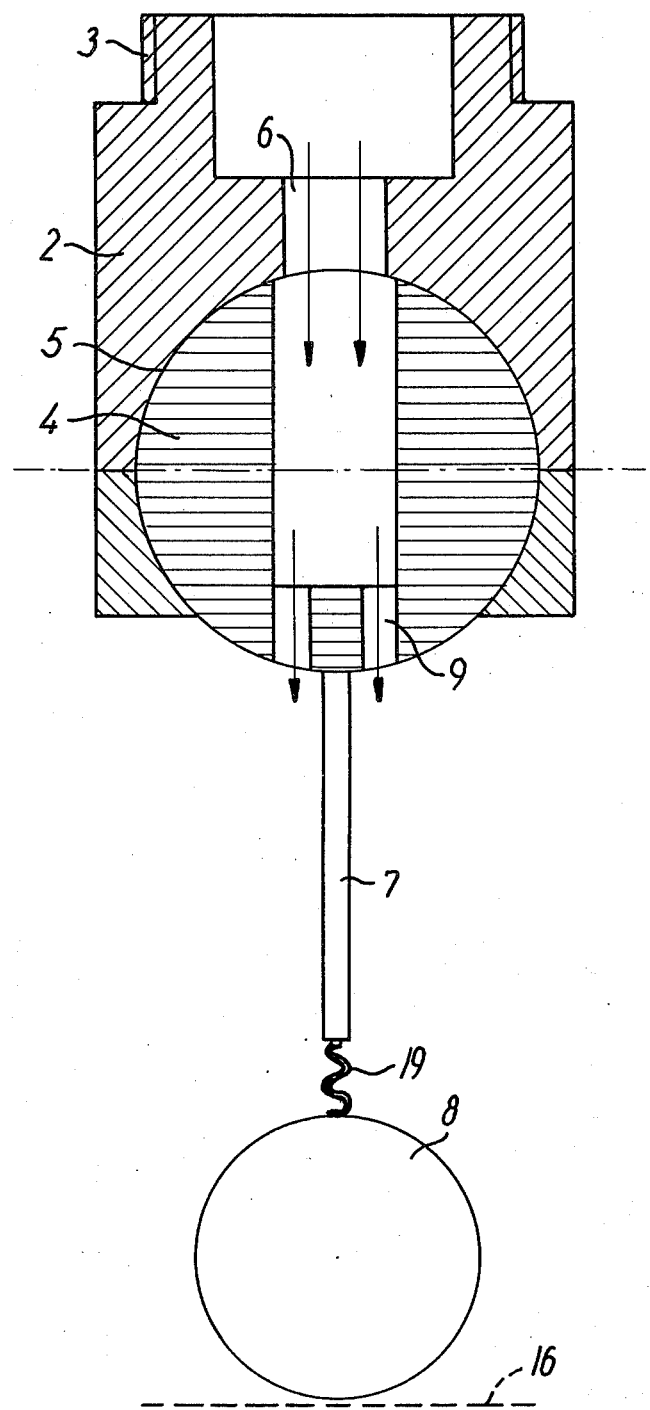

VALVE DEVICE FOR THE PREVENTION OF THE OVERFILLING OF PORTABLE CONTAINERS, PARTICULARY GAS CYLINDERS

BACKGROUND OF THE INVENTION

When containers are to be filled with liquid gas it is essential that filling be stopped at an appropriately early stage so that the liquid gas occupies only part of the container space, usually about 80% of its total volume. Failing this, there is a considerable risk that the cylinder will explode, if it is subjected to heating, even if only to a relatively moderate degree.

For this purpose it is customary to perfom the filling process through a channel with a valve connected to a float so as to be closed when the liquid in the cylinder has reached the prescribed, highest level. It is, however, conditional to the closing of the valve at the correct stage that the gas cylinder is in an upright position during filling, since a slanting position can cause the float to react too early or too late. From the point of view of safety, too early closing of the valve cannot, of course, cause any damage, whereas if the valve closes at too late a stage the result may be dangerous overfilling. A customer or consumer would normally not be aware of this risk, but he would, on the other hand, soon discover that if the cylinder is tilted or held at an angle in a certain direction it is possible to fill an extra amount of gas into the cylinder, and the customer will naturally be tempted to take advantage of this possibility, especially if payment is fixed for "a charge", regardless of the amount filled.

The risk of overfilling can be obviated when filling takes place at an authorized filling station, as special safety devices can be installed to prevent all filling, unless the cylinder is fixed in the correct filling position, but for one thing such safety device can—intentionally or unintentionally—be put out of action, and for another gas filling often takes place in completely unsupervised conditions, e.g. from a large gas tank installed on customer's premises.

A purpose of the invention is to provide a structurally uncomplicated valve device which in all circumstances may prevent overfilling of liquid gas cylinders and similar containers by interrupting the filling operation both in case the container deviates from its prescribed filling position and when the level of the amount filled into the container has reached a pre-stipulated height.

SUMMARY OF THE INVENTION

The valve device of the invention is operative to prevent overfilling of portable containers, particularly liquid gas cylinders, by automatically interrupting the fluid flow through a filling channel both when a predetermined filling level has been reached in the container and when the container does not occupy a prescribed filling position, by means of a slide valve formed by a ball that is seated against a spherical surface to which said filling channel extends. Said ball is associated with a downwardly extending load member to normally hold the ball in a given orientation so that, during filling up to a given level, a passage extending through the ball communicates with said filling channel only when the container occupies the prescribed filling position. When said given level has been reached, the load member is partly submerged in the liquid gas and acts as a float, and it is carried by a flexible link allowing the member to rise with the rising level and thereby to rotate the ball so that its passage is brought out of communication with the filling channel.

The term "prescribed filling position" does not necessarily denote an exactly defined position, such as an absolutely vertical position for a liquid gas cylinder, since a certain deviation, e.g. as much as 10°–15°, would in practice be an acceptable margin without jeopardizing the desired safety against overfilling.

The function of the valve device is a result of the fact that as long as the load member is freely pending, the ball will always seek towards a given position, regardless of the position of the cylinder, and that the ball together with the spherical surface act as a slide valve which is open solely when the position of the container is in accordance with the orientation of the ball to such a degree that the filling channel communicates with the passage of the ball. Consequently, filling can only take place when the cylinder is in its prescribed position. This is in itself no guarantee against overfilling but for this purpose the ball is made so-to-speak double-acting in the way that it functions as explained in the foregoing when the load is freely pending in the cylinder whereas the load member when raised as a float by the liquid level in the cylinder exerts an eccentric buoyancy on the ball and causes it to tilt so as to disconnect the passage of the ball from the filling channel, thereby interrupting the filling operation.

ACKNOWLEDGEMENT OF PRIOR ART

Spherical closure valves which by gravity are urged towards a given orientation are known for special purposes. Thus, U.S. Pat. No. 2,082,723 discloses such a valve which under certain conditions shall establish communication from a fuel tank to the atmosphere and under other conditions shall prevent such communication.

BRIEF DESCRIPTION OF THE DRAWINGS

On the drawing, an embodiment of the invention is illustrated in a vertical sectional view.

DETAILED DESCRIPTION OF THE PREFERRED EMBODIMENT

The top wall of an ordinary liquid gas cylinder, not shown, is provided with a spout 2 which is threaded at 3 so that it can be coupled to a hose from a liquid gas store. The spout forms a casing for a freely rotatable ball 4 seated against a spherical surface 5 in the casing which presents a filling channel 6 ending in the surface 5. Through a rod 7 the ball 4 is connected to a load member 8 tending to keep the ball in a given orientation independent of the orientation of the liquid gas cylinder 1. On the drawing it is assumed that this cylinder is standing or is suspended in a substantially vertical position, and in this situation the fluid filling channel 6 communicates with a passage 9 extending through the ball 4. This ball 4 is double-acting in the sense that it causes the filling operation to be interrupted both if the liquid gas cylinder or the corresponding container is tilted as explained in the foregoing, and when the liquid level 16 in the container has reached a predetermined level. In the latter case the interruption is due to the fact that the load member 8 when submerged in the liquid gas acts as a float and is connected to the rod 7 by means of a flexible link 19 while the rod itself is rigidly secured to the ball 4. A rising of the liquid level 16 will thus cause only the member 8 to move upwards so that it comes to rest against a side of the rod 7 and, due to its buoyancy, provoke a rotation or tilting of the ball 4, thereby breaking the communication between the channel 6 and the passage 9.

For the sake of completeness it should be noticed that the prevention of further filling must not necessarily be total. Thus, a flow passage may be left open, the throughflow capacity of which corresponds to the normal consumption and is, of course, much smaller than the throughflow capacity required for the normal filling operation.

I claim:

1. A valve device to prevent overfilling of portable containers, particularly liquid gas cylinders, comprising a casing having a spherical surface and a fluid filling channel opening in said spherical surface, a freely rotatable ball resting against said spherical surface, a passage extending through said ball, and a load member associated with the ball and extending downwardly therefrom to normally hold the ball in such a position relative to said casing that during the filling operation said passage communicates with said fluid filling channel only when said container is held in a prescribed filling position, said load member forming a float, when submerged in the liquid gas, and a flexible link connecting said load member to a rod fixed in said ball.

* * * * *